Patented Sept. 13, 1932

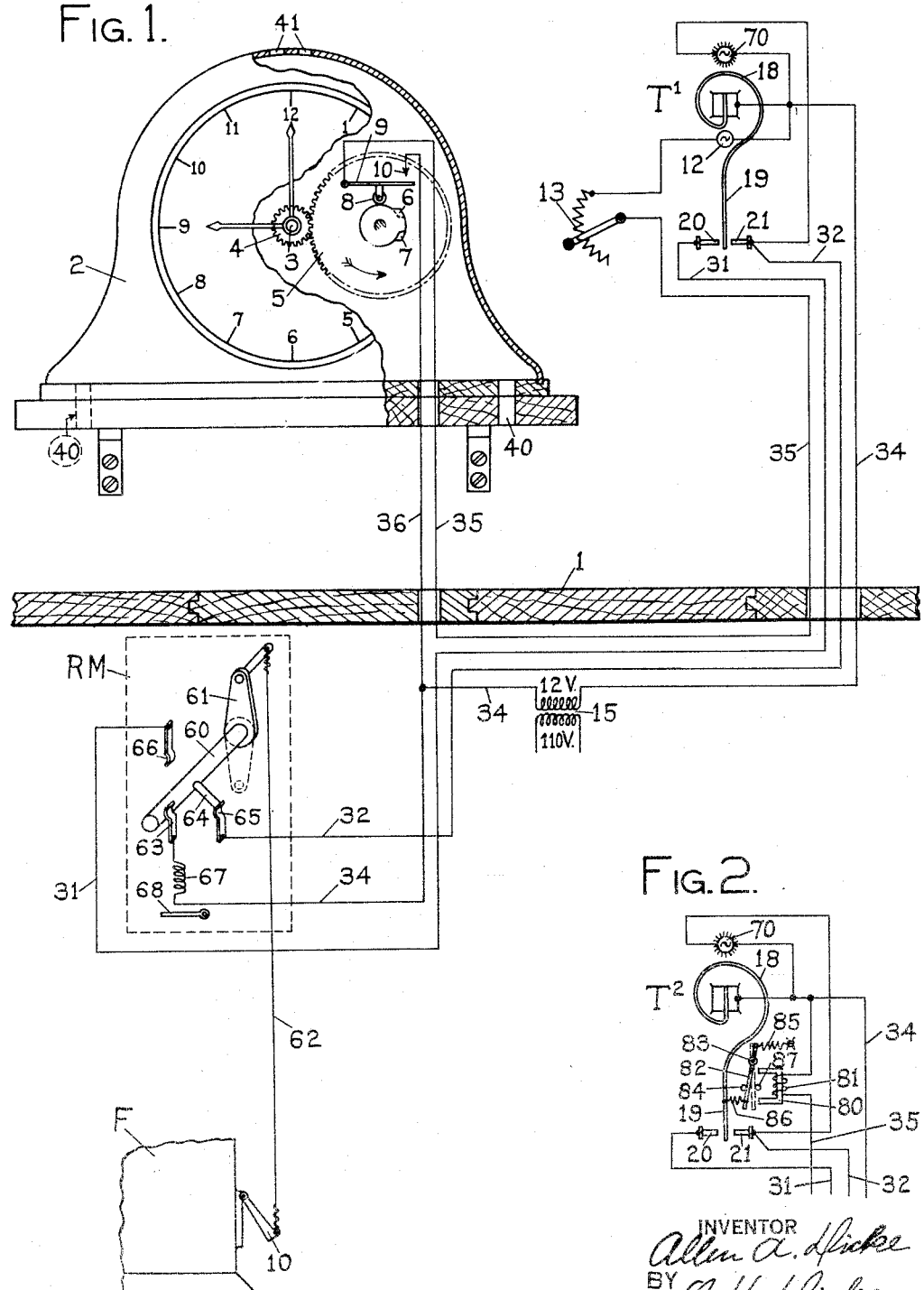

1,876,636

UNITED STATES PATENT OFFICE

ALLEN A. DICKE, OF MONTCLAIR, NEW JERSEY, ASSIGNOR TO PIONEER HEAT REGULATOR CORPORATION, A CORPORATION OF NEW JERSEY

TEMPERATURE REGULATING SYSTEM

Application filed September 26, 1929. Serial No. 395,368.

This invention relates to temperature regulating systems for controlling the dampers and (or) fuel supply of furnaces, and more particularly to the features of automatically maintaining a certain temperature during the day-time and evening and maintaining a definite and lower temperature during the night.

In systems of the type mentioned it is found expedient to maintain a definite lower temperature during the night than is required during the day time, this not only to economize in fuel, but also, for those cases in which coal or coke are used as fuel, it is desirable to have the furnace dampers open during the night once or twice to avoid the fire getting coked up so that it may go out entirely or may get in such a condition that it would take hours before any appreciable amount of heat could be derived from such furnace. In other words, it is not deemed sufficient to close a furnace automatically at bed time and to again open such furnace in the morning, it being desirable that the furnace be opened a few times after midnight, this in order to keep the furnace fire in a condition for rapid expansion in the morning when the temperature is to be brought back up to normal daytime living-room temperature.

It has been mentioned that it is contemplated to change the temperature from normal living-room temperature to night control temperature automatically, and obviously suitable chronometer means would be used for this purpose. If a clock of the usual type is used this clock would be preferably located at a particular point in a room quite often unsuitable for the location of the thermostat for controlling the furnace, and in accordance with the present invention it is proposed to have the clock for shifting the control of such thermostat from day to night temperature control, located at a point remote from the thermostat which controls the furnace in accordance with the room temperature.

More specifically it is proposed in accordance with the present invention, to employ a thermostat which will control a suitable regulator motor in accordance with the temperature of the room, which motor in turn controls the furnace, to employ a clock of high quality located at any desirable location in the same dwelling for driving a 24-hour-shaft provided with contacts which are closed during the time that the room temperature is to be reduced, and to locate an electrical heating element near the thermostat element which electric heating element is energized when said contacts are closed, so that this heating element will keep the temperature of the thermostat element a definite number of degrees above room temperature. In another form of the present invention it is proposed to employ an electro-magnet associated with the thermostat in such a way as to act to cause the thermostat element to be adjusted to maintain a definite lower temperature than the temperature maintained if this action does not take place.

Other objects, purposes and characteristic features of the invention are in part apparent from the drawing and will in part be pointed out hereinafter.

In describing the invention in detail reference will be made to the accompanying drawing in which:—

Fig. 1 conventionally illustrates the entire system embodying one form of my invention; and Fig. 2 shows the thermostat of a modified form of my invention with the wires so numbered as to show how this thermostat may be connected in the system shown in Fig. 1.

Referring to Fig. 1 of the drawing the floor between the living room and the basement of a dwelling has been illustrated at 1, and shows the clock 2 and the thermostat T¹ in the living room and the regulating motor RM and the furnace F in the basement. This clock 2 has its hour shaft 3 provided with a pinion 4 engaging a gear 5, this pinion 4 and gear 5 having a ratio to turn the gear 5 one revolution for every 24 revolutions of the hour shaft 3, so that the gear 5 and the cams 6 and 7 mounted thereon make one revolution for every 24 hours of clock movement. The cams 6 and 7, have cam portions, as shown, and these cams are adjustable as far as the length of their effective angle of camming action is concerned and also as to at what hour this camming action shall start, and lift the roller 8 from 5 to 10 hours depending on the adjustment of the cams 6 and 7. As clearly shown in the drawing, lifting of the roller 8 closes contacts 9—10 for purposes more clearly pointed out hereinafter. Also, if desired, the wheel 5 may be driven by a synchronous motor such as shown in Fig. 6 of the application of O. H. Dicke, Ser. No. 365,584 filed May 23, 1929.

The regulator motor may be one of any suitable construction, and is preferably such as described in my prior application, Ser. No. 320,015, filed November 17, 1928, which has a crank arm 61 which through the medium of a chain or wire 62 controls the damper 10 of the furnace F. This regulating motor may be one of the spring actuated type and includes a trip coil or release coil 67, which if momentarily energized actuates the armature 68 and allows the crank 61 to operate through substantially 180°, the shaft 60 in turning, through the medium of contact pin 64, selects the opposite brushes 65 or 66, thereby selecting the opening wire 31 or the closing wire 32, which in turn may be energized by the thermostat T¹ located in the living room of the dwelling or other apartment, to again operate the motor.

The thermostat T¹ may be of any suitable construction but preferably is one of the type disclosed in my prior application, to which reference has been made, and includes a pilot or compounding lamp 70 which is illuminated when the furnace is open and produces sufficient heat in the by-metallic thermal element 18 so that a slight additional amount of heat due to rise in the room temperature will cause the contact arm 19 to engage the stationary contact 21 and thereby again close the furnace, all as explained in my prior application.

In addition to the pilot and compounding lamp 70 there is provided a night control heating element 12, which is connected to be electrically energized when the contacts 9 and 10 of the clock 2 are closed. This heating element 12 may be of any suitable construction, but preferably is a lamp having a carbon filament and is located just below the bi-metallic thermal element 18. This heating element 12 is designed to raise the temperature of the bi-metallic thermal element 18 any desirable number of degrees, such as 15°, above the room temperature. From this it will readily appear that if the heating element 12 is electrically energized that the room temperature at which the furnace will be opened will be 15° lower than it would if this heating element were not electrically energized, and the same thing is true as far as closing the furnace is concerned, so that the room temperature will be held at a value below the normal room temperature depending upon the number of degrees that the bi-metallic thermal element is heated above room temperature by the night control heating element 12. The difference between the day and the night temperature may be varied by means of rheostat 13.

*Operation:*—To obtain a clearer understanding of the operating characteristics of the system it is considered expedient to briefly consider the operation thereof. Attention is directed to the fact that the clock 2 indicates 9 o'clock, this being 9 P. M. as distinguished from 9 A. M. It will be noted that the furnace F is now open, the damper 10 being open, and it will be noted that the opening wire 31 has its circuit open at the brush 66, so that movement of the contact 19 of the thermostat T¹ to the left in engagement with the stationary contact 20 would not close any circuit nor produce any functioning of the apparatus. Also, it will be noted that the compound and pilot light 70 is illuminated thereby having raised the temperature of the thermostat to an extent (possibly one degree) to bring the contact arm 19 almost in engagement with the stationary contact 21. In this connection attention is directed to the fact that the current for the compounding lamp 70 flows through the trip coil 67 of the regulating motor RM, and is derived from the secondary winding 12V of the transformer 15, having its primary winding connected to a 110 volt current source marked 110V, this circuit including elements 34, 67, 63, 64, 65, 32, 70, and 34. This flow of current is not sufficient to actuate the armature 68 and operate the motor RM. As soon as the temperature of the room increases a small amount, sufficient to cause the contact 19 to engage the stationary contact 21, the lamp 70 will be shunted, the armature 68 of the regulator motor RM will be tripped and the regulating motor will operate to the dotted position and close the furnace F, thereby causing the contacts 64—66 to close, thus selecting the opening wire 31, and placing the apparatus in condition for again opening the furnace. Obviously, operation of the regulating motor RM to its dotted position extinguishes the pilot and compounding lamp 70, thereby again cooling the bi-metallic thermostat element 18 to an extent to almost cause the contact 19 to engage the stationary contact 20. From this it will readily appear that a slight further drop in room temperature will cause the contacts 19—20 to close thereby again tripping the regulator mechanism RM and operating the damper 10 to the furnace open position.

Let us now observe what will happen at about 11 P. M. when the cams 6—7 raise the roller 8 to close the contacts 9—10 in the clock 2. The closing of these contacts 9 and 10 electrically energizes the heating element 12 through wires 34, 35, and 36, thereby bringing the temperature of the bi-metallic thermostat element 18 to substantially 15° above room temperature. Assuming the room temperature to have been 70° the temperature of the thermostat element 18 will be substantially 85° from which it will readily appear that the furnace will be closed, and will remain closed until the room temperature drops to substantially 15° below the normal setting of the thermostat T¹, namely to 55°, it being assumed that the thermostat T¹ has been adjusted for a day-time temperature of 70°. The thermostat T¹ will thus maintain the room at a temperature of 55 degrees by opening and closing the furnace when necessary. Obviously, when the contacts 9—10 in the clock 2 are again opened, which may be after a lapse of 5 to 10 hours, depending upon the adjustment of the cams 6 and 7. As heretofore mentioned these cams 6 and 7 each contain a cam portion equivalent to 5 hours of operation, and these cams 6 and 7 are arranged in over-lapped relation, so that the effective cam position is adjustable and may constitute an effective cam having a length of any amount between 5 and 10 hours in extent.

It is further desired to be understood that even though it is desirable to have the clock 2 and the thermostat T¹ located at different locations in the room in certain cases, this is not absolutely necessary, and that, if desired, the thermostat T¹ together with its lamp 70 and heating element 12 may be located in the clock housing, in which event suitable ventilating openings will be provided to allow the room air to circulate through the clock housing, and such openings have been shown at 40 and 41. In this case the lamp 70 will be so located as to be visible from the outside and act as a pilot light. The light from the lamp 12 should also be visible so as to indicate when the system is set for maintaining a lower temperature.

*Modified form of the invention:*—In Fig. 2 of the drawing there has been shown a thermostat T², in which is exactly the same as the one shown in Fig. 1, except that the heating element 12 has been omitted and an electro-magnet 80, having a winding 81 and an armature 82 have been substituted therefor, the winding 81 being substituted for the heating element 12 in the circuit arrangement shown in Fig. 1 of the drawing. The armature 82 is pivoted at 83 and is held against the stop 84 by the spring 85. If now, the winding 81 is energized, as is the case after midnight, the armature 82 is attracted against the other stop 87, thereby tensioning the small spring 86 to a definite amount equivalent to the tension produced by the thermostatic element 18 upon a change in temperature of say 15°, so that the room temperature will be regulated to a value below the normal temperature of this amount when the electro-magnet 80—81 is energized. In other words, the small spring 86 when rendered active in response to energization of the electro-magnet 80—81 biases the movable contact 19 toward the furnace closing-position to an extent equivalent to a change of 15° room temperature, so that the thermostat T² maintains the room at this definite differential lower temperature when the electro-magnet 80—81 is energized than is the case when this electro-magnet 80—81 is de-energized. Attention has been directed to my prior application to which reference may be had with respect to the heat regulator system disclosed in said application, and attention is directed to the fact that the elements assigned reference numbers 18—19—20—21—31—32—34—60—61—63—64—65—66—67—68 and 70 of said prior application have been assigned to corresponding elements of the present application.

Having thus shown several embodiments of the present invention, it is desired to be understood that the particular embodiments of the invention illustrated have been selected for the purpose of facilitating disclosure of the underlying principles of the invention and its operating characteristics, and have not been selected for the purpose of showing the exact construction preferably employed in practicing the invention or for illustrating the scope of the invention, and that various changes, modifications, and additions may be made to adapt the invention to the particular heating plant and building to be heated, all without departing from the spirit or scope of the invention, or the idea of means underlying the same, except as demanded by the scope of the following claims.

What I claim as new is:—

1. In a temperature controlling system, the combination with a dwelling room, of a furnace for heating said room, temperature responsive means for controlling the flow of heat from said furnace to said room to maintain the temperature of said room at a predetermined value, an auxiliary heat source adjacent said temperature responsive means rendered active when said temperature responsive means has been operated to its increased heat-flow position, time controlled means, circuit controlling means controlled by said time controlled means, and means for causing said temperature responsive means to regulate the temperature of said room to a lower value including a circuit including a second auxiliary heat source and effective when said circuit controlling means is closed.

2. In a temperature controlling system, the combination with a dwelling room, of a furnace for heating said room, control means for controlling the rate of heat flow from said furnace to said room, bi-metallic thermal metal for controlling said control means to maintain the temperature of said room at a predetermined value, an auxiliary electric heat source adjacent said bi-metallic thermal metal rendered active when said control means is in its increased heat-flow condition, time controlled means, circuit controlling means controlled by said time controlled means, and a second auxiliary electric heat source adjacent said bi-metallic metal rendered active when said circuit controlling means closes an energizing circuit therefore, whereby said first mentioned auxiliary heat source compounds the action of said furnace upon said bi-metallic thermal metal and said dwelling room is maintained at a predetermined lower temperature so long as said second heat source is energized.

ALLEN A. DICKE.